United States Patent
Loison et al.

(10) Patent No.: US 9,120,576 B2
(45) Date of Patent: Sep. 1, 2015

(54) EMERGENCY ELECTRIC POWER GENERATION ASSEMBLY FOR AN AIRCRAFT, AN AIRCRAFT AND ASSOCIATED METHOD

(71) Applicant: DASSAULT AVIATION, Paris (FR)

(72) Inventors: Renaud Loison, Paris (FR); Olivier Savin, Suresnes (FR)

(73) Assignee: DASSAULT AVIATION, Paris (FR)

( * ) Notice: Subject to any disclaimer, the term of this patent is extended or adjusted under 35 U.S.C. 154(b) by 424 days.

(21) Appl. No.: 13/748,703

(22) Filed: Jan. 24, 2013

(65) Prior Publication Data

US 2013/0187448 A1    Jul. 25, 2013

(30) Foreign Application Priority Data

Jan. 25, 2012 (FR) ...................... 12 00209

(51) Int. Cl.
  B64D 25/00    (2006.01)
  B64D 41/00    (2006.01)
  H02J 9/06     (2006.01)
  H02J 4/00     (2006.01)
  H02J 9/00     (2006.01)
  H02J 1/00     (2006.01)

(52) U.S. Cl.
  CPC ............ *B64D 25/00* (2013.01); *B64D 41/00* (2013.01); *H02J 4/00* (2013.01); *H02J 9/06* (2013.01); *B64D 2041/005* (2013.01); *H02J 2001/004* (2013.01); *Y02B 90/14* (2013.01); *Y02T 90/36* (2013.01)

(58) Field of Classification Search
  USPC .......................................................... 307/64
  See application file for complete search history.

(56) References Cited

U.S. PATENT DOCUMENTS

| 6,011,324 A | 1/2000 | Kohlstruck et al. |
| 6,551,731 B1 | 4/2003 | Berg et al. |
| 2002/0006536 A1 | 1/2002 | Liu et al. |
| 2004/0247961 A1 | 12/2004 | Edlund |
| 2008/0210812 A1 | 9/2008 | Gans et al. |

OTHER PUBLICATIONS

French Search Report, dated Oct. 12, 2012, from corresponding FR application.

*Primary Examiner* — Robert Deberadinis
(74) *Attorney, Agent, or Firm* — Young & Thompson

(57) ABSTRACT

This assembly (24) includes an emergency electricity generator (60). The electricity generator assembly (24) is controllable between an inactive rest configuration and an active configuration for producing energy in which the emergency electricity generator (60) delivers emergency electric energy to the electric network (20), without being electrically powered by the electric network (20). The emergency electric power generation assembly (24) is able to be placed in an intermediate standby configuration, in which the emergency electric power generation assembly (24) is electrically powered by the electric network (20) so that the emergency electricity generator (60) produces standby electric energy of lower power than the power delivered by the emergency electricity generator (60) in the active configuration.

20 Claims, 3 Drawing Sheets

EMERGENCY ELECTRIC POWER GENERATION ASSEMBLY FOR AN AIRCRAFT, AN AIRCRAFT AND ASSOCIATED METHOD

The present invention relates to an emergency electric power generation assembly for an aircraft, comprising an emergency electricity generator, intended to be connected to an electric network of the aircraft;

the electric power generation assembly being controllable between an inactive rest configuration in which the emergency electricity generator is inactive and an active energy production configuration in which the emergency electricity generator delivers emergency electric energy to the electric network, without being electrically powered by the electric network.

Such an assembly is intended to form an emergency electric power source, when the different systems for producing electric energy on an aircraft are faulty.

The electric power is intended to power the essential piloting and control instruments of the aircraft so as to allow the pilot to bring back the aircraft safely to the ground.

In order to produce emergency electric power on an aircraft, the use of turbines which may be deployed from the cabin is known, designated by the term of <<Ram Air Turbine >> or <<RAT >>.

Such a system, always consisting of a propeller driving an alternator, may commonly be deployed from a hold and is driven by the displacement speed of the aircraft relatively to the air mass (a principle similar to a wind turbine).

For obvious reasons of airplane drag and vibration, this system is never tested during flight and should therefore be considered in reliability analysis like an achievable function but as a dormant failure, i.e. the quality of its operation is unknown before its deployment and its activation, but is assumed to be satisfactory by specific periodic (therefore costly) maintenance.

In addition to the notion of dormant failure, the system by itself has three major drawbacks. The first relates to the time for activating the emergency electric power generation. Indeed, the system has a deployment time, and then a time for setting the propeller into rotation and then an availability time for the produced electric energy. This time is of several seconds which requires that batteries have been installed in order to suitably power the airplane platform while waiting for the RAT system to become operational. Taking these batteries into account makes the aircraft heavy and therefore consequently increases the general fuel consumption.

The second relates to the link between the airplane speed and the available power of the RAT system. As the system operates on the principle of a wind turbine, the higher the relative speed between the propeller and the air mass and the more the available electric power (torque) will be significant. The problem is posed in the approach and landing phases where the relative speed is less significant than in the gliding phases towards reaching an airport, the result of this is a loss of available power in the final phase requiring the use of an additional source (usually batteries).

The third relates to the installation of such a system in an aircraft which further generates structural size constraints (hatch+actuator), constraints on the dimensioning of the structure notably because of the high vibratory level caused by the use of a wind turbine system, whence finally an increase in the overall mass of the aircraft.

In order to overcome all these problems, WO 2006/094743 describes an emergency electric power generation assembly of the aforementioned type. Such an assembly includes a fuel cell, which is capable of generating electric power by an oxidation-reduction reaction between hydrogen and oxygen. Gas cartridges are therefore loaded on board the aircraft for powering the cell. In the case of an emergency, the cartridges are connected to the fuel cell which is activated for producing electric energy.

Such an assembly may have a reliability level equal to or greater than an emergency system of the RAT type. However, it does not give entire satisfaction.

As the fuel cell is used only in the case of emergency, it may have a long start-up time, notably for attaining a satisfactory operating temperature. In certain cases, the cell may not work at all.

In order to solve this problem, it is theoretically possible to operate the cell continuously. However, such an operation would require the loading on board of a large amount of gas for feeding the cell in the aircraft. Special infrastructures would therefore have to be set into place on the ground in order to allow periodic reloading of the compartments containing the gases feeding the cell, independently of the fuel loaded in the aircraft.

An object of the invention is therefore to obtain an emergency electric power generation assembly on an aircraft, which is very safe, while having minimum maintenance and simple operating conditions.

For this purpose, the object of the invention is an assembly of the aforementioned type, characterized in that the emergency electric power generation assembly is able to be placed in an intermediate standby configuration, in which the emergency electric power generation assembly is electrically powered by the electric network so that the emergency electricity generator produces standby electric energy with a power less than the power delivered by the emergency electricity generator in the active configuration.

The assembly according to the invention may comprise one or more of the following features, taken individually or according to all technically possible combinations:

the emergency electricity generator includes a fuel cell;
it includes a first source for supplying the emergency electricity generator allowing the emergency electricity generator to produce standby electric energy, the first power supply source being electrically powered by the electric network in the intermediate standby configuration;
the first source includes an electrolyzer able to generate at least one gas fuel intended to feed the fuel cell upon receiving electric energy from the electric network;
the first source includes a tank of fluid to be electrolyzed, the electrolyzer being able to electrolyze the fluid from the tank in order to produce a reducing fuel and an oxidizing fuel intended to feed the fuel cell;
the tank of fluid to be electrolyzed contains water, the electrolyzer being able to electrolyze water from the tank in order to produce oxygen and hydrogen intended to feed the fuel cell;
it includes a second source for supplying the emergency electricity generator, the second supply source being able to supply the emergency electricity generator without receiving any electric energy from the electric network of the aircraft;
the second source includes at least one tank of gas fuel for feeding the fuel cell;
the second source is connected to the emergency electric energy generator via a pyrotechnic actuator, the pyrotechnic actuator being advantageously able to be activated by a mechanical, photonic, pyrotechnic, thermal or electric energy command;

the pyrotechnic actuator includes a pyrotechnic valve;

the pyrotechnic valve includes a first obturated tube segment having a first end, and a second tube segment obturated at one end located facing the first end, the pyrotechnic valve including a piston which may be displaced between an inactive rest position in which the ends are obturated, and an active position for putting the first tube segment in communication with the second tube segment.

The object of the invention is also an aircraft characterized in that it includes:

a electric network;

at least one main electricity generator assembly coupled with a propulsion engine of the aircraft in order to provide electric energy to the electric network when the propulsion engine is active;

an emergency electric power generation assembly as defined above, the emergency electricity generator being connected to the electric network of the aircraft.

The aircraft according to the invention may comprise the following feature:

it includes an auxiliary electricity generator assembly including an auxiliary generator capable of operating independently of said or each propulsion engine of the aircraft, of the emergency electric power generation assembly, the auxiliary generator being fed by a liquid fuel tank present in the aircraft.

The object of the invention is also a method for generating electricity in an aircraft, including the following steps:

providing an emergency electric power generation assembly as defined above, the emergency electricity generator being connected to the electric network of the aircraft;

during a normal flight phase of the aircraft, operating the electricity generator assembly in its intermediate standby configuration, the electricity generator assembly being electrically powered by the electric network of the aircraft, the emergency electricity generator producing standby electric energy delivered to the electric network;

during an emergency phase, controlling the emergency electric power generation assembly from its standby configuration towards its active configuration for producing energy, in which it provides emergency electric energy to the electric network, without receiving any electric energy from the electric network, the emergency electric energy being of a higher power than that of the standby electric energy produced in the intermediate standby configuration.

The method according to the invention may comprise one or more of the following features, taken individually or according to all technically possible combinations:

the emergency electric power generation assembly includes a first source for supplying the emergency electricity generator capable of supplying the emergency electricity generator in order to produce standby electric energy, and in that in the intermediate standby configuration, the first supply source is electrically powered by the electric network;

the emergency electric power generation assembly includes a second emergency electric power supply of the generator, and in that, during the emergency phase, the second supply source supplies the emergency electricity generator without receiving electric energy from the electric network;

the emergency electricity generator includes a fuel cell, the fuel cell producing standby electric energy in the intermediate configuration.

The invention will be better understood upon reading the description which follows, only given as an example, and made with reference to the appended drawings, wherein.

Figure 1:
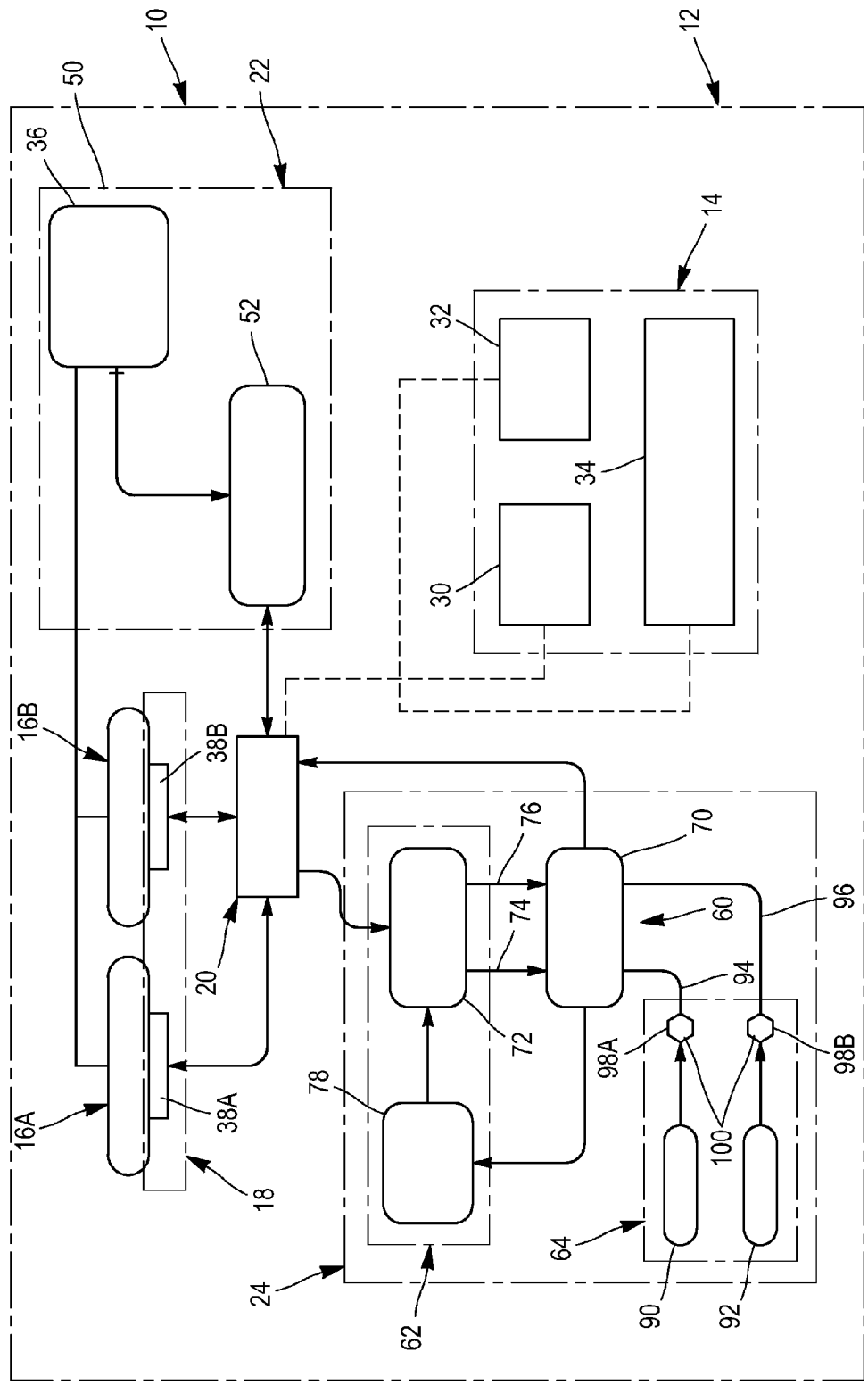
FIG. 1 is a functional block diagram of a first aircraft according to the invention, provided with an emergency electric power generation assembly including a fuel cell, the cell being in an intermediate standby configuration.
Figure 2:
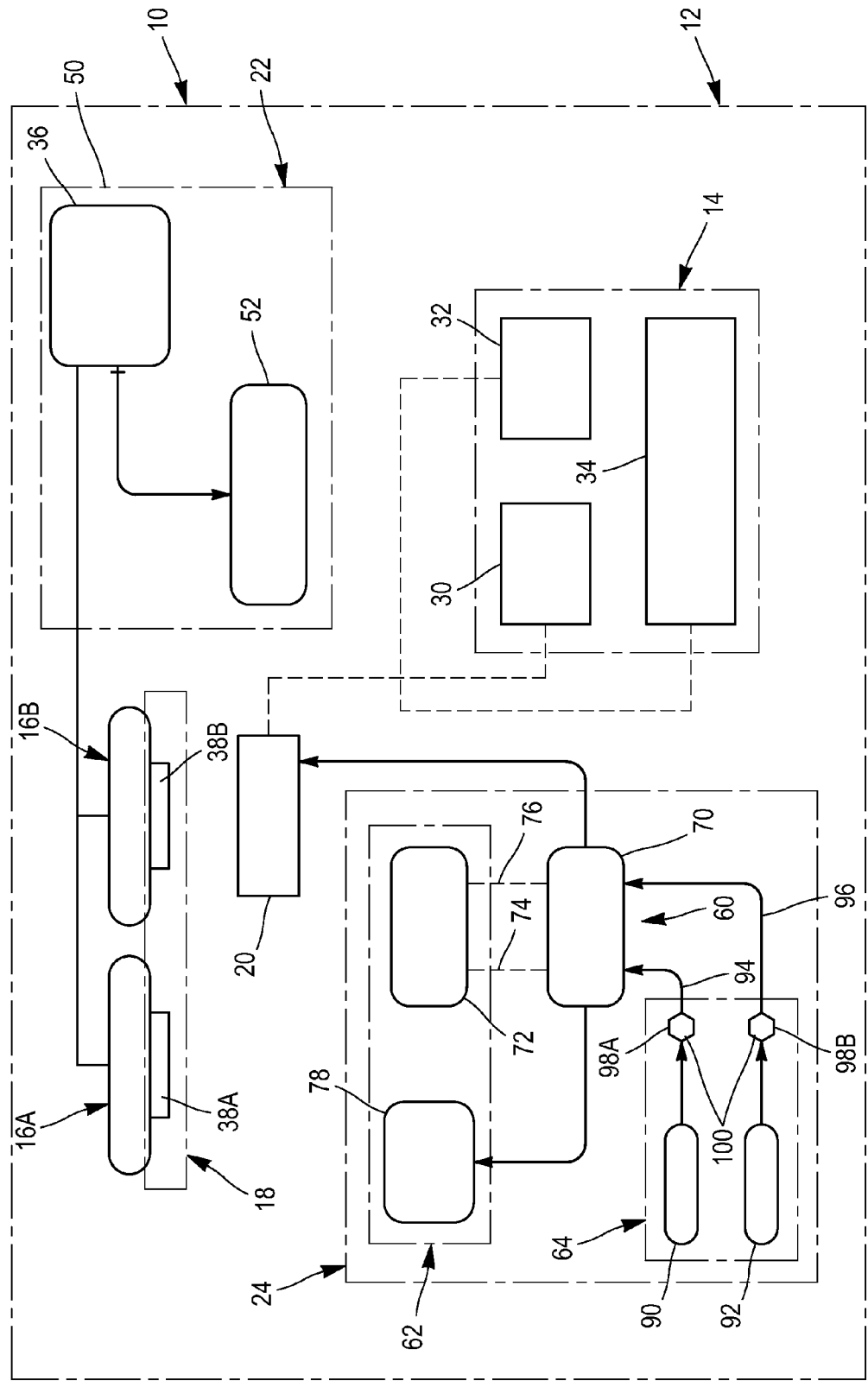
FIG. 2 is a view similar to FIG. 1, in an active configuration for energy production by the fuel cell.

A first aircraft 10 according to the invention is illustrated by FIG. 1.

In a known way, the aircraft 10 includes a fuselage 12 delimiting an enclosure 14 for receiving occupants, functional equipment of the aircraft and optionally luggage and/or goods.

The aircraft 10 further includes at least one engine 16A, 16B, a main assembly 18 for generating electric energy, coupled with at least one engine 16A, 16B and an electric network 20 connected to the main assembly 18.

Advantageously, the platform 10 further includes an auxiliary assembly 22 for generating electricity. It also includes an emergency electric power generation assembly 24 according to the invention.

The enclosure 14 includes a cockpit 30 intended for transporting a crew piloting the aircraft 10, a cabin 32 intended for transporting passengers and/or goods, and a hold 34.

The cockpit 30, the cabin 32, and the hold 34 are electrically connected to the electric network 20 for electrically powering the electric equipment which they contain.

Each engine 16A, 16B is intended for propulsion of the aircraft 10, notably for allowing its taking off and for maintaining it in flight off the ground.

In the example illustrated in FIG. 1, the aircraft 10 includes at least two engines 16A, 16B, the number of engines 16A, 16B may more generally be comprised between 1 and 4.

In this example, each engine 16A, 16B is a turbojet engine comprising a turbine driven into rotation by the combustion of a liquid fuel (such as kerosene) in order to generate a thrust.

For this purpose, each engine 16A, 16B is connected to at least one tank 36 of liquid fuel.

The electric network 20 is intended for electrically powering the functional assemblies of the aircraft 10. The electric network 20 notably powers a flight control computer, pumps, navigation instruments, and accessory equipment present in the cockpit 30, in the cabin 32 and/or in the hold 34.

In the example illustrated in FIG. 1, the main electricity generator assembly 18 includes a generator 38A, 38B including at least one rotor (not shown) driven into rotation by the turbine of an engine 16A, 16B or by a current of gas generated by the engine 16A, 16B. The generator 38A, 38B includes a stator.

The generator 38A, 38B is thus able to produce electric energy during the rotation of the turbine of the engine 16A, 16B, on the ground, or in flight.

Each generator 38A, 38B is electrically connected to the electric network 20 in order to provide the electric energy which it produces, to the network 20.

The auxiliary assembly 22 is for example formed by a self-contained electricity generator system 50, able to generate additional electric energy independently of each electricity generator 38A, 38B coupled with each engine 16A, 16B. The self-contained system 50 is able to generate electric energy notably when each engine 16A, 16B is at a standstill.

The system 50 includes an auxiliary generator 52, fed with liquid fuel for example provided by the tank 36, or by a self-contained tank (not shown).

The auxiliary generator 52 generally includes a rotary shaft (not shown) and a power turbine able to drive into rotation the rotary shaft under the effect of gas compressed in the combustion chamber fed with the fuel.

Such a system 50 is for example described in the French patent applications No. 1101512 and No. 11011511 of the Applicant.

The auxiliary assembly 22 is thus able to provide electric energy to the network 20 independently of the electric energy provided by the main assembly 18, and notably in the absence of electric energy provided by the main assembly 18, for example when the engines 16A, 16B are at a standstill or as an addition to them.

Advantageously, the auxiliary assembly 22 is also able to achieve conditioning of the atmosphere present in the enclosure 14, as described in the aforementioned applications of the Applicant.

According to the invention, the emergency electric power generation assembly 24 includes an emergency generator 60 intended to produce emergency electric energy for powering the electric network 20 in the case of a failure of the main generator 18 and/or of the auxiliary assembly 22.

The emergency assembly 24 includes at least one first source 62 for supplying the emergency generator 60, intended to be connected to the electric network 20 so as to be electrically powered by the network 20 and at least one second source 64 for supplying the emergency generator capable of supplying the emergency generator 60 independently of the electric network 20.

As this will be seen later on, the emergency assembly 24 may be controlled between an inactive configuration, an intermediate standby configuration and an active configuration for producing emergency electric energy.

In the inactive configuration, the emergency generator 60 is inactive and does not produce any electric energy.

In the intermediate standby configuration, the first supply source 62 is powered by the electric network 20 for activating the emergency generator 60 in order to produce standby electric energy.

In the active configuration for producing energy, the emergency generator 60 is supplied by the second source 64, independently of the electric network 20, in order to produce emergency electric energy powering the electric network 20.

In the example illustrated in FIG. 1, the emergency generator 60 is formed with a fuel cell 70.

In a known way, the fuel cell 70 receives a reducing gas fuel and an oxidizing gas fuel which are respectively oxidized on a first electrode and on a second electrode of the cell 70. Oxidation-reduction of the reducing fuel and of the oxidizing fuel produces electrons which flow from the first electrode towards the second electrode. In general, the electrodes are mounted on either side of a proton exchange membrane or on a solid oxide membrane.

The reducing fuel is for example hydrogen and the oxidizing fuel is for example oxygen.

The reaction between the fuel produces a fluid, notably a liquid such as water.

The fuel cell 70 is electrically connected to the electric network 20.

The first source 62 includes an electrolyzer 72 intended to produce the reducing fuel and the oxidizing fuel from a fluid to be electrolyzed, a first conduit 74 for feeding the reducing fuel to the cell 70 and a second conduit 76 for feeding the oxidizing fuel to the cell 70. The first source 62 further includes a tank 78 of fluid to be electrolyzed, such as a tank of water and advantageously, a conduit 80 for collecting the fluid recovered in the cell 70 for forwarding it to the tank 78.

The electrolyzer 72 is electrically connected to the electric network 20. In the intermediate standby configuration, when the electrolyzer is electrically powered by the network 20, it is able to electrolyze the fluid contained in the tank 78 in order to form the reducing fuel and the oxidizing fuel and for continuously forwarding them continuously to the cell 70 through the first conduit 74 and the second conduit 76 respectively.

The second source 64 includes a first self-contained tank 90 of reducing fuel and a second self-contained tank 92 of oxidizing fuel. It further includes a third conduit 94 for feeding the cell 70 with reducing fuel and a fourth conduit 96 for feeding the cell 70 with oxidizing fuel.

The second source 64 further includes on each conduit 94, 96 an actuator 98A, 98B normally enclosed in the inactive configuration and in the standby configuration. The actuator 98A, 98B is able to free the conduit 94, 96 in the active configuration.

Advantageously, each tank 90, 92 is formed by a pressurized gas cartridge, the cartridge being removable in order to form an additional tank.

Advantageously, the cartridges are conditioned in the form of a replaceable rack.

Each tank 90, 92 contains a mass of gas for example of less than 10 kg. The gas is for example maintained at a pressure above 70 bars.

The third conduit 94 connects the first tank 90 to the cell 70. The fourth conduit 96 connects the second tank 92 to the cell 70.

Each actuator 98A, 98B is normally inactive. It thus obturates the conduit 94, 96 on which it is mounted and prevents passing of the gas contained in the tank 90, 92 towards the cell 70 in the inactive configuration and in the standby configuration.

Each actuator 98A, 98B may be activated for example by an energy command which may be mechanical, photonic, pyrotechnic, thermal or/and electric, for opening the conduit 94, 96 and allowing flow of fuel from the tank 90, 92, towards the cell 70.

Figure 4:
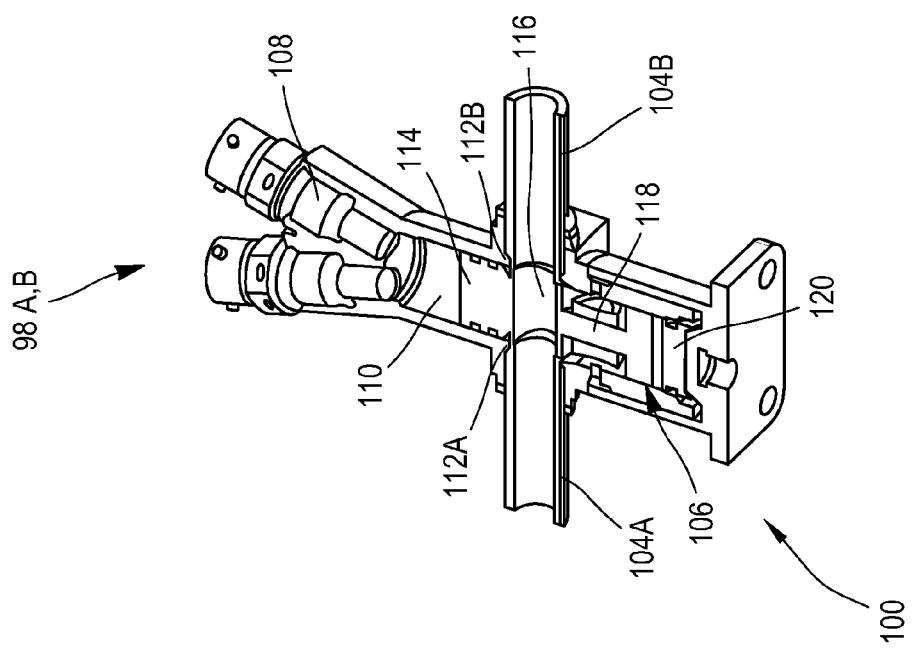
FIG. 4 is a view similar to FIG. 3, in the active configuration which is illustrated in FIG. 2.

In a particular embodiment, each actuator 98A, 98B is formed with a pyrotechnic valve 100. An exemplary pyrotechnic valve 100 is illustrated by FIGS. 3 and 4.

The valve 100 may be activated from a rest state in which it prevents passing of fluid, towards an activated state in which it allows passing of fluid.

Figure 3:
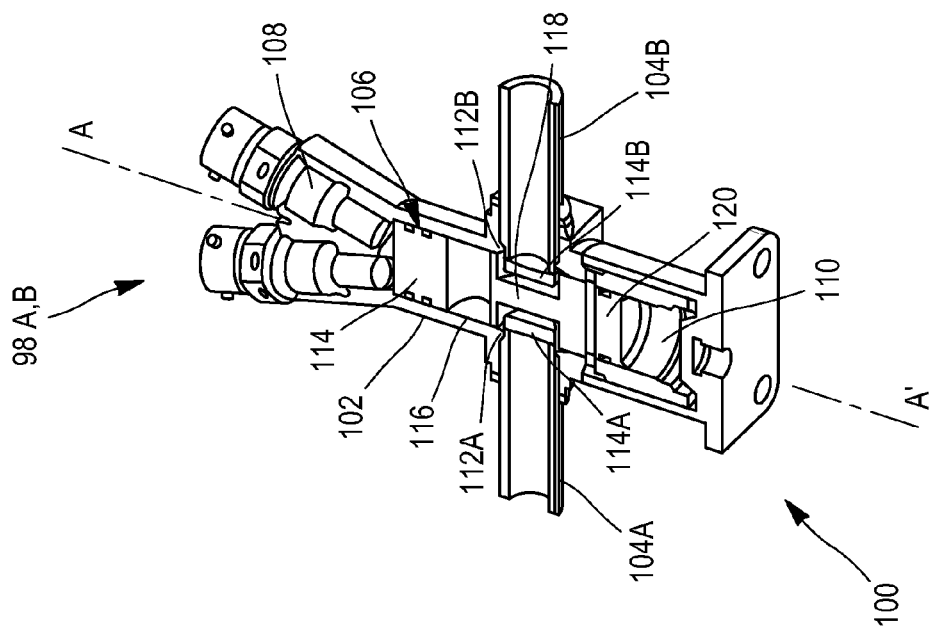
FIG. 3 is a perspective and partial sectional view of a first pyrotechnic actuator present in the emergency generator assembly in the standby configuration illustrated in FIG. 1

As illustrated by FIG. 3, the valve 100 includes a sleeve 102 receiving a first upstream tube segment 104A connected to the conduit 94, 96 and a second downstream tube segment 104B connected to the conduit 94, 96, the segments 104A, 104B being disconnected.

The valve 100 further includes a piston 106 movably mounted in the sleeve 102 between the first segment 104A and the second segment 104B, and at least one assembly 108 for displacing the piston 106, upon receiving an energy command for activating the valve 100.

The sleeve 102 delimits an internal cavity 110 for circulation of the piston 106. In this example, the cavity 110 has a central axis A-A'. It delimits two transverse apertures 112A, 112B for inserting the respective segments 104A, 104B into the cavity 110.

As specified above, the segments 104A, 104B are normally disconnected, they extend, protruding into the cavity 110, facing each other.

The piston 106 is inserted between the segments 104A, 104B, each segment 104A, 104B has free end 114A, 114B which is obturated when the valve 100 is in its rest state.

This obturation is for example achieved by partial machining of the segment 104A, 104B. A plug is thus present at each end 114A, 114B. The segments 104A, 104B are unable to communicate with each other in the rest state.

The piston 106 includes a head 114, a hollow intermediate portion 116 intended for connecting the segments 104A, 104B together and a lower cut-out portion 118 of the ends 114A, 114B of the segments 104A, 104B. The piston 106 further includes an end portion 120 for guiding the piston in the cavity 110.

As illustrated by FIGS. 3 and 4, the piston 106 is displaceable translationaly in the cavity 110 between a rest position, illustrated in FIG. 3 and an active position for putting the first segment 104A in communication with the second segment 104B, illustrated in FIG. 4.

In the rest position, the hollow portion 116 is axially located away from the segments 104A, 104B. The segments 104A, 104B are received in housings made in the cut-out portion 118. They are blocked at their free ends 114A, 114B.

The head 114 is located relatively closer to the displacement assembly 108.

In the active position, the piston 106 was displaced away from the displacement assembly 108. The cut-out portion 118 has cut out the free ends 114A, 114B for placing the hollow portion 116 between the segments 104A, 104B. The segments 104A, 104B are then in fluidic communication with each other through the hollow portion 16.

The displacement assembly 108 is for example formed with a pressurized gas generator such as a squib, a gas generator or a pyrotechnic detonator.

The displacement assembly 108 is activated by an energy command. Upon receiving the energy command, the displacement assembly 108 is able to produce a pressurized gas in the cavity 110 upstream from the head 114 and to thereby displace the piston 106.

The operation of the aircraft 10 and of the emergency generator assembly 24 will now be described.

Initially, on the ground, when the aircraft 10 is on its parking space, the main electricity generator assembly 18, the auxiliary assembly 22 and the emergency assembly 24 are inactive.

Next, before starting an engine 18A, 18B, the auxiliary assembly 22 is used for producing electric energy provided to the network 20. For this purpose liquid fuel is provided to the auxiliary generator 52 from the tank 36. The combustion of the fuel in a combustion chamber (not shown) drives a rotary shaft which produces electric energy.

When at least one engine 16A, 16B is started, the engine 16A, 16B drives into rotation the rotor of the generator 38A, 38B with which it is coupled. This allows the main assembly 18 to produce electric energy. This electric energy is transmitted to the network 20 for powering the different functional assemblies of the equipment of the aircraft 10 present in the cockpit 30, in the cabin 32, and/or in the hold 34.

Moreover, before take-off of the aircraft 10 or once the aircraft 10 is in flight, the electric network 20 powers the emergency assembly 24 in order to have the emergency generator 60 pass from its inactive configuration to its intermediate standby configuration. For this purpose, standby electric energy is provided to the first source 62 in order to allow supply of the emergency generator 60.

In the case when the generator 60 is a fuel cell 70, the electric network 20 provides electric energy to the electrolyzer 72. The electrolyzer 72 receives fluid present in the tank 78 and produces, by electrolysis of the fluid, reducing gas fuel and oxidizing gas fuel. These fuels are respectively conveyed by the conduit 74, 76 towards the fuel cell 70.

An oxidation-reduction reaction then occurs in the cell 70 between the oxidizing and reducing fuels for generating a current of electrons which is transmitted to the electric network 20 of the apparatus. The liquid obtained is conveyed to the tank 78 through the conduit 80.

In the standby configuration, the second source 64 is inactive and the actuators 98A, 98B occupy their rest state preventing the gas present in the tanks 90, 92 from feeding the cell 70.

Advantageously, the emergency generator 60 produces standby electric energy continuously during the flight, which guarantees that the generator 60 operates, and is maintained at a temperature, for example at a temperature above 60° C., which ensures that it is maintained in an operational condition. Continuous operation of the emergency generator system 60 also gives the possibility of getting rid of the problem of dormant failures which may potentially affect the systems which do not operate continuously.

The electric power provided by the second generator 60 is however maintained to a minimum, for example by being less than 500 W for limiting the amount of electric energy which the electric network 20 has to provide for powering the first source 62.

Further, as the standby electric power generated by the cell 70 is given back to the electric network 20, the overall efficiency is improved.

In the case of an electric failure affecting the main generator 18 and the auxiliary generator 22, the pyrotechnic actuators 98A, 98B pass from their inactive state to their activated state.

An energy command is transmitted to the assembly 108 for displacing the piston 106. This energy command activates the displacement assembly 108 which produces a gas for displacing the piston 106 in the cavity 110. The piston 106 then moves in the cavity 110 and puts the segments 104A, 104B in fluidic communication, advantageously by cutting out the ends 114A, 114B of the segments.

In the active configuration, the first source 62 is disconnected from the electric network 20. The electrolyzer 72 is then disabled.

The oxidizing fuel and the reducing fuel respectively present in the tanks 92, 90 flow through the conduits 94, 96 towards the cell 70 for feeding the cell 70.

The emergency generator 60 then produces electric energy with a power greater than that of the standby electric energy produced in the standby configuration, in order to power the electric network 20 and maintain the essential instrumentation and control functionalities of the aircraft. This power is for example greater than 1 kW.

As the fuel cell 70 is maintained permanently at a temperature, in the intermediate standby configuration, it may directly switch into the active configuration, with a very short start-up time, for example of less than 10 ms, due to the time for actuating the pyrotechnic valves and the time for having the fluids flow as far as into the fuel cell 70.

However, there is no interruption in the operation of the fuel cell, because of the fact that during these 10 ms, there exists an arrival of residual gas from the electrolyzer, even if it has been inactivated.

Therefore it is not necessary to provide large capacity batteries for ensuring continuity in the provision of electric energy to the network 20. The airplane battery is sufficient and is only used for possibly completing the power supply provided by the fuel cell in the case when the latter would not be able to instantaneously provide the totality of the required energy, only in the case of strong loading requirements.

Further, as the first source 62 produces all the fuel required for feeding the cell 70 in its standby configuration, it is not necessary to provide large volume tanks, 90, 92 for the reagents used for feeding the emergency generator 60. These reagents are permanently available as they are produced on site in the aircraft 10.

This reduces the mass of the aircraft 10 and avoids the carrying out of a fuel filling before each flight. In the example of an oxygen and a hydrogen cell, the only fluid required for continuous operational system, in the intermediate configuration, is water.

Further, the second source 64 may only be used in the case of an emergency and gives the possibility of producing sufficient energy in the case of emergency in order to bring the aircraft 10 back to the ground. Thus, the fuel cell 70 may be dimensioned for this extreme emergency mode, which avoids an increase in its mass notably on smaller size aircraft 10.

The use of pyrotechnic valves 100 reinforces the reliability of the emergency assembly 24. The overall energy balance of the emergency assembly 24 remains substantially unaltered, since the electrolyzer 72 is maintained inactive on the ground, and since it produces a portion (for example at least 30%) of the electric energy which is required for its operation.

The use of tanks 90, 92 in the form of cartridges or/and racks greatly simplifies maintenance operations.

The numerical values indicated in the present description are given as an example applied to the field of business aircraft (for maximum masses at take-off of less than 100,000 lbs (about 45,000 kg). These values should be adapted depending on the type, weight and size of aircraft taking on board the emergency electric power generation assembly according to the invention.

The emergency assembly 24 according to the invention therefore provides a much safer system than the mechanical emergency turbines, while having minimum maintenance and very simple operational conditions.

The invention claimed is:

1. An emergency electric power generation assembly (24) for an aircraft (10), comprising an emergency electricity generator (60), intended to be connected to an electric network (20) of the aircraft,
the electricity generator assembly (24) being controllable between an inactive rest configuration in which the emergency electricity generator (60) is inactive and an active configuration for producing energy in which the emergency electricity generator (60) delivers emergency electric energy to the electric network (20) without being electrically powered by the electric network (20),
characterized in that the emergency electric power generation assembly (24) is able to be placed in an intermediate standby configuration, in which the emergency electric power generation assembly (24) is electrically powered by the electric network (20) so that the emergency electricity generator (60) produces standby electric energy with a power of less than the power delivered by the emergency electricity generator (60) in the active configuration.

2. The assembly (24) according to claim 1, characterized in that the emergency electricity generator (60) includes a fuel cell (70).

3. The assembly (24) according to claim 2, characterized in that it includes a first source (62) for supplying the emergency electricity generator (60) allowing the emergency electricity generator (60) to produce standby electric energy, the first supply source (62) being electrically powered by the electric network (20) in the intermediate standby configuration.

4. The assembly (24) according to claim 3, characterized in that the first source (62) includes an electrolyzer (72) able to generate at least one gas fuel intended for feeding the fuel cell (70) upon receiving electric energy from the electric network (20).

5. The assembly (24) according to claim 3, characterized in that it includes a second source (64) for supplying the emergency electricity generator (60), the second supply source (64) being able to supply the emergency electricity generator (60) without receiving any electric energy from the electric network (20) of the aircraft.

6. The assembly (24) according to claim 5, characterized in that the second source (64) includes at least one gas fuel tank (90, 92) for feeding the fuel cell (70).

7. The assembly (24) according to claim 5, characterized in that the second source (64) is connected to the emergency electric energy generator (60) via a pyrotechnic actuator (98A, 98B), the pyrotechnic actuator (98A, 98B) being advantageously able to be activated by a mechanical, photonic, pyrotechnic, thermal or electric, energy command.

8. The assembly (24) according to claim 7, characterized in that the pyrotechnic actuator includes a pyrotechnic valve (100).

9. The assembly (24) according to claim 8, characterized in that the pyrotechnic valve (100) includes a first obturated tube segment (104A) having a first end (114A), and a second tube segment (104B) obturated at one end (114B) located facing the first end (114A), the pyrotechnic valve (100) including a piston (106) which may be displaced between an inactive rest position in which the ends (114A, 114B) are obturated, and an active position for putting the first tube segment (104A) in communication with the second tube segment (104B).

10. The assembly (24) according to claim 1, characterized in that it includes a first source (62) for supplying the emergency electricity generator (60) allowing the emergency electricity generator (60) to produce standby electric energy, the first supply source (62) being electrically powered by the electric network (20) in the intermediate standby configuration.

11. The assembly (24) according to claim 10, characterized in that it includes a second source (64) for supplying the emergency electricity generator (60), the second supply source (64) being able to supply the emergency electricity generator (60) without receiving any electric energy from the electric network (20) of the aircraft.

12. The assembly (24) according to claim 11, characterized in that the second source (64) is connected to the emergency electric energy generator (60) via a pyrotechnic actuator (98A, 98B), the pyrotechnic actuator (98A, 98B) being advantageously able to be activated by a mechanical, photonic, pyrotechnic, thermal or electric, energy command.

13. An aircraft (10) characterized in that it includes:
an electric network (20);
at least one main electricity generator assembly (18) coupled with a propulsion engine (16A, 16B) of the aircraft (10) for providing electric energy to the electric network (20) when the propulsion engine (16A, 16B) is active;

an emergency electric power generation assembly (24) according to claim 1, the emergency electricity generator (60) being connected to the electric network (20) of the aircraft.

14. The aircraft (10) according to claim 13, characterized in that it includes an auxiliary electricity generator assembly (22) including an auxiliary generator (50) capable of operating independently of said or each propulsion engine (16A, 16B) of the aircraft and of the emergency electric power generation assembly (24), the auxiliary generator (50) being fed by a liquid fuel tank (36) present in the aircraft.

15. A method for generating electricity in an aircraft (10) including the following steps:

providing an emergency electric power generation assembly (24) according to claim 1, the emergency electric energy generator (60) being connected to the electric network (20) of the aircraft (10);

during a normal flight phase of the aircraft (10), operating the electricity generator assembly (24) in its intermediate standby configuration, the electricity generator assembly (24) being electrically powered by the electric network (20) of the aircraft, the emergency electricity generator (60) producing standby electric energy delivered to the electric network (20);

during an emergency phase, controlling the emergency electric power generation assembly (24) from its standby configuration to its active configuration for producing energy in which it provides emergency electric energy to the electric network (20), without receiving any electric energy from the electric network (20), the emergency electric energy being of a power greater than that of the standby electric energy produced in the intermediate standby configuration.

16. The method according to claim 15, characterized in that the emergency electric power generation assembly (24) includes a first source (62) for supplying the emergency electricity generator (60), able to power the emergency electricity generator (60) in order to produce standby electric energy, and in that in the intermediate standby configuration, the first supply source (62) is electrically powered by the electric network (20).

17. he method according to claim 16, characterized in that the emergency electric power generation assembly (24) includes a second emergency source (64) for electrically powering (60) the generator, and in that, during the emergency phase, the second supply source (62) supplies the emergency electricity generator (60) without receiving any electric energy from the electric network (20).

18. The method according to claim 16, characterized in that the emergency electricity generator (60) includes a fuel cell (70), the fuel cell (70) producing standby electric energy in the intermediate configuration.

19. The method according to claim 15, characterized in that the emergency electric power generation assembly (24) includes a second emergency source (64) for electrically powering (60) the generator, and in that, during the emergency phase, the second supply source (62) supplies the emergency electricity generator (60) without receiving any electric energy from the electric network (20).

20. The method according to claim 15, characterized in that the emergency electricity generator (60) includes a fuel cell (70), the fuel cell (70) producing standby electric energy in the intermediate configuration.

* * * * *